US012224526B2

(12) United States Patent
Chen

(10) Patent No.: US 12,224,526 B2
(45) Date of Patent: Feb. 11, 2025

(54) ELECTRICAL CONNECTING MEMBER AND FLOATING CONNECTOR

(71) Applicant: XIAMEN GHGM INDUSTRIAL TRADE CO., LTD, Xiamen (CN)

(72) Inventor: Bingshui Chen, Xiamen (CN)

(73) Assignee: XIAMEN GHGM INDUSTRIAL TRADE CO., LTD, Xiamen (CN)

( * ) Notice: Subject to any disclaimer, the term of this patent is extended or adjusted under 35 U.S.C. 154(b) by 465 days.

(21) Appl. No.: 17/857,145

(22) Filed: Jul. 4, 2022

(65) Prior Publication Data

US 2023/0327375 A1 Oct. 12, 2023

(30) Foreign Application Priority Data

Apr. 8, 2022 (CN) ......................... 202210366967.6

(51) Int. Cl.
*H01R 13/631* (2006.01)
*H01R 13/11* (2006.01)

(52) U.S. Cl.
CPC ......... *H01R 13/6315* (2013.01); *H01R 13/11* (2013.01)

(58) Field of Classification Search
CPC .... H01R 13/6315; H01R 13/11; H01R 12/73; H01R 12/716; H01R 12/91; H01R 13/2442; H01R 13/193; H01R 13/40
See application file for complete search history.

(56) References Cited

U.S. PATENT DOCUMENTS

2023/0306219 A1* 9/2023 Son .......................... G06K 7/00

FOREIGN PATENT DOCUMENTS

CN 112003053 A * 11/2020
CN 107017501 B * 5/2023 ............. H01R 12/55

* cited by examiner

*Primary Examiner* — Jean F Duverne

(57) ABSTRACT

An electrical connecting member includes an elastic connecting portion, a first fixing portion, and a second fixing portion. The first fixing portion and the second fixing portion are respectively disposed on two sides of the elastic connecting portion. A contact head portion is disposed on the second fixing portion in an upward direction. The contact head portion includes an extending segment and a bending segment. An electrical contact region is defined between the extending segment and the connecting portion. The bending segment is bent towards a lower portion of the electrical contact region and is connected to the second fixing portion through the extending segment. A free end of the bending segment is bent towards the extending segment to form an arc-shaped protrusion and is disposed in the accommodating groove.

12 Claims, 10 Drawing Sheets

ELECTRICAL CONNECTING MEMBER AND FLOATING CONNECTOR

TECHNICAL FIELD

The present disclosure relates to a technical field of electrical connectors, and in particular to an electrical connecting member and a floating connector.

BACKGROUND

A floating connector generally refers to a socket connector having a floating displacement amount for easy alignment and connection with an external plug connector. At present stage, a connector with surface-to-surface contact is normally connected only when the connector completely matches with the external plug connector. The connector with surface-to-surface contact cannot achieve normal connection when positions of internal connecting members are deviated, so that requirements of the connector are high, and efficiency of which is low. Therefore, the floating connector effectively realizes a plugging and matching mode having large tolerance.

Known so far, the floating connector includes an outer shell, a floating inner shell, and an elastic contact. The outer shell is secured to a circuit board, the floating inner shell is embedded into a fitting portion of a mating connector, and the elastic contact component is held across both the outer shell and the inner shell. The floating inner shell is configured to be movable relative to the outer shell through elastic deformation of the elastic contact, so as to conveniently absorb deviation between the circuit boards or deviation from a fitting position of the mating connector.

In order to ensure reliable contact fit between inner contact components, even if higher insertion precision is not required, in order to improve effectiveness of a contact mode and operability during use, problems of use effect and service life of each connection assembly further need to be guaranteed.

SUMMARY

In view of above, a purpose of the present disclosure is to provide an electrical connecting member and a floating connector to solve above problems.

The present disclosure adopts following scheme.

The present disclosure provides the electrical connecting member, which is configured on an inner base, and an accommodating groove is defined on the inner base. The electrical connecting member includes an elastic connecting portion, a first fixing portion, and a second fixing portion. The first fixing portion and the second fixing portion are respectively disposed on two sides of the elastic connecting portion. A contact head portion is disposed on the second fixing portion in an upward direction. The contact head portion includes an extending segment and a bending segment. An electrical contact region is formed between the extending segment and the elastic connecting portion. The bending segment is bent towards a lower part of the electrical contact region, and the bending segment is connected to the second fixing portion through the extending segment. A free end of the bending segment is bent towards the extending segment to form an arc-shaped protrusion, the free end of the bending segment is disposed in the accommodating groove, and the arc-shaped protrusion at least partially protrudes out of the accommodating groove so as to be electrically connected to an external contact component.

Furthermore, components on the electrical connecting member have same thickness. The connecting portion is configured in a U-shaped flexible shape, where the U-shaped flexible shape is elastically deformed in a left-right direction, two side edges of the elastic connecting portion are respectively connected to the first fixing portion and the second fixing portion. When the elastic connecting portion is projected in an X-axis direction, a middle width of the two side edges of the elastic connecting portion is smaller than a top width or a root width of the connecting portion of the elastic connecting portion.

Furthermore, when the elastic connecting portion is projected in the X-axis direction, the width of the two side edges of the elastic connecting portion gradually increases from middle to bottom of the elastic connecting portion, so that a large rounded corner connection is formed where the two side edges respectively connect with the first fixing portion and the second fixing portion.

Furthermore, the first fixing portion extends outwards to form an extending portion, and a bolt is disposed between the first fixing portion and the extending portion.

Furthermore, components on the electrical connecting member have a same thickness, a projection of the second fixing portion in the X-axis direction is in a sheet shape, and the extending segment extends upwardly from a portion of the sheet-shaped second fixing portion.

Furthermore, when the electrical connecting member is projected in the X-axis direction, the second fixing portion is in a rectangular sheet shape, and a width of the extending segment is smaller than a length or a width of the rectangular sheet shape.

Furthermore, a plurality of positioning convex hulls are defined on the second fixing portion, and the plurality of the positioning convex hulls are distributed on a front side of the second fixing portion and a rear side of the second fixing portion.

Furthermore, four positioning convex hulls are defined on the second fixing portion, two of the four positioning convex hulls are diagonally defined at a first surface of the second fixing position, and other two of the four positioning convex hulls are diagonally defined on a second surface of the second fixing position.

Furthermore, the second fixing portion is recessed downwards to form a connecting guide angle with the extending segment.

Furthermore, the electrical connecting member is formed through stamping one time, and the electrical connecting member is made of metal conductive material.

The present disclosure further provides the floating connector, including an outer base, an inner base, and the electrical connecting member. The first fixing portion is connected to the outer base, the second fixing portion is connected to the inner base, and the inner base is movable relative to the outer base under an action of the connecting portion.

Furthermore, a clamping space and an accommodating groove for inserting an external object are defined on the inner base, and the clamping space is adjacent to and communicates with the accommodating groove. An extending segment of the electrical connecting member is disposed in the accommodating groove. An upper end of the extending segment is obliquely bent towards a bottom of the accommodating groove to form a bending segment. An arc-shaped protrusion defined on the bending segment is at least partially located in the clamping space. A free end of the bending segment is bent towards the extending segment and then is located in the accommodating groove.

By adopting above technical scheme, the present disclosure achieves following technical effects:

In the electrical connecting member of the present disclosure, the electrical contact region is defined between the extending segment and the connecting portion of the contact head portion of the electrical connecting member. The bending segment of the contact head portion is bent towards the lower portion of the electrical contact region and is disposed on the second fixing portion through the extending segment, so as to be bent inward to realize rapid and efficient electrical contact. In particular, the arc-shaped protrusion newly defined at the free end of the bending segment is specifically bent relative to the whole and is elastically guided to the inner end side of the electrical contact region to form the arc-shaped protrusion in a free end portion in a contact direction, so that the arc-shaped protrusion is adaptively and elastically engaged on a matched external contact component after being contacted, which significantly improves operability of the elastic contact. In addition, the free end portion of the bending and guiding inward contact head portion is more flexible and has better elastic recovery, which greatly improves a contact mode of a contact head, avoids a collapse problem caused by frequent joint work of the contact head portion, and improves overall service life of the electrical connecting member.

BRIEF DESCRIPTION OF DRAWINGS

In order to more clearly illustrate technical solutions of embodiments of the present disclosure, drawings required in the embodiments are briefly described below. It is to be understood that the following drawings illustrate only certain embodiments of the present disclosure and are therefore not to be considered limiting of a scope. For a person of ordinary skill in art, other related drawings are obtained according to the drawings without involving any inventive effort.

Figure 1:
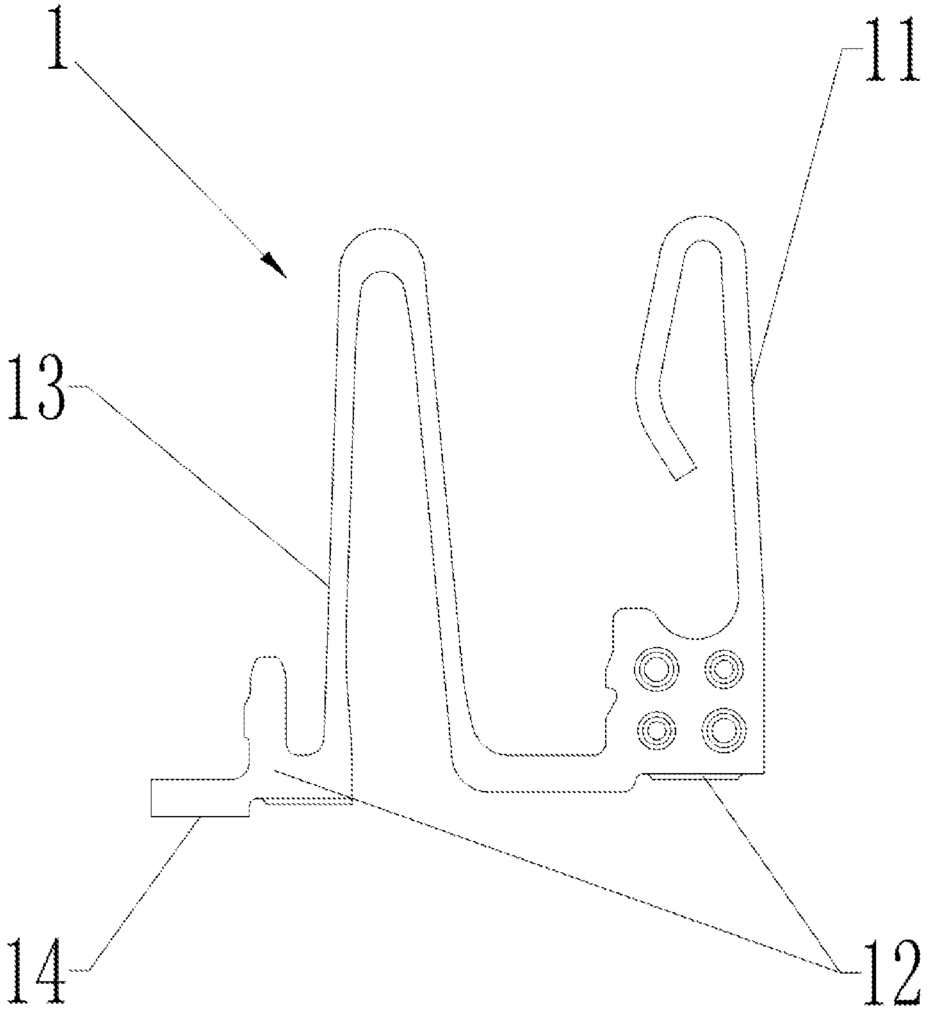
FIG. 1 is a structural schematic diagram of an electrical connecting member according to one embodiment of the present disclosure.

Reference number in the drawings: 1. electrical connecting member; 11. contact head portion; 111. arc-shaped protrusion; 112. extending segment; 113. bending segment; 12. fixing portions; 121. first fixing portion; 122. second fixing portion; 1221. positioning convex hulls; 13. connecting portion; 131. U-shaped flexible; 14. extending portion; 2. outer base; 21. first mounting cavity; 3. inner base; 31. fitting portion; 32. base portion; 321. accommodating groove; 33. outer body; 34. second mounting cavity; 4. plug-in matching portion; and 41. contact component.

DETAILED DESCRIPTION

In order to make objectives, technical solutions and advantages of embodiments of the present disclosure clearer, the technical solutions in the embodiments of the present disclosure are clearly and completely described below with reference to accompanying drawings in the embodiments of the present disclosure. Obviously, the described embodiments are part of the embodiments of the present disclosure, and not all of the embodiments.

Figure 2:
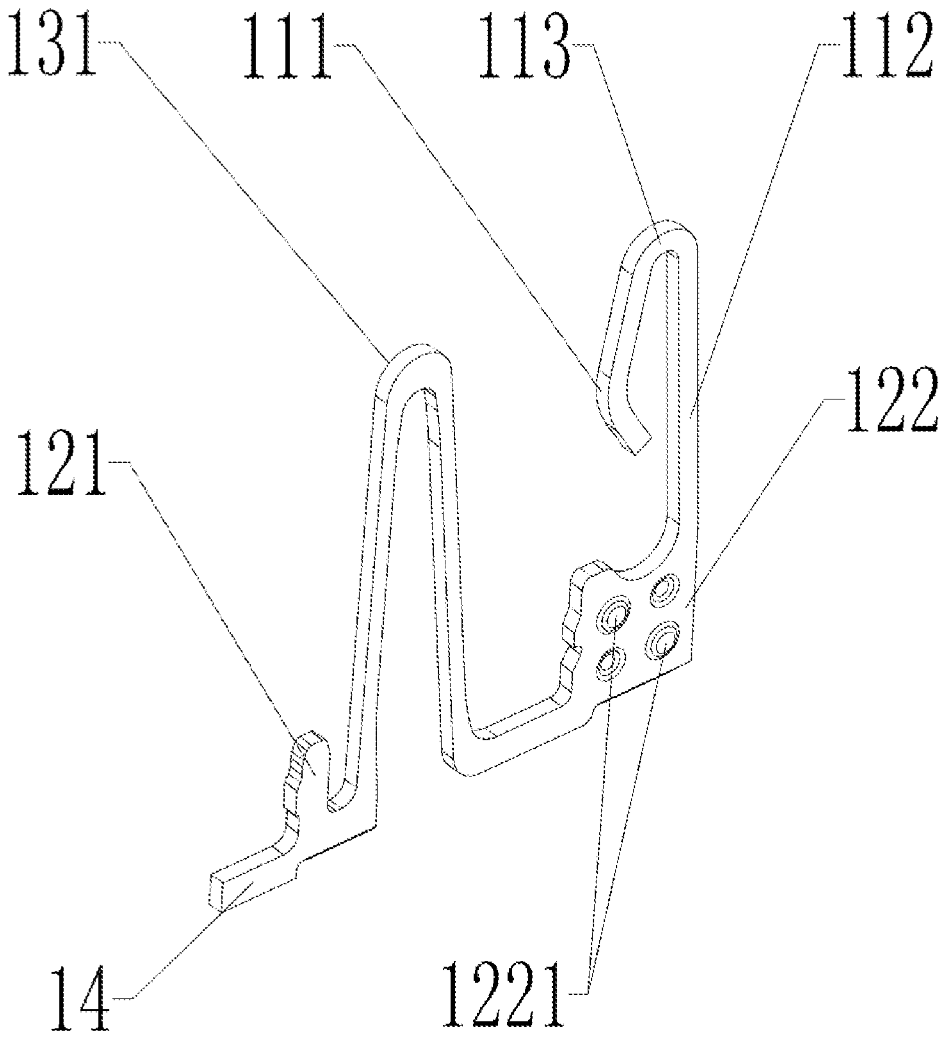
FIG. 2 is a structural schematic diagram of FIG. 1 at a viewing angle.
Figure 3:
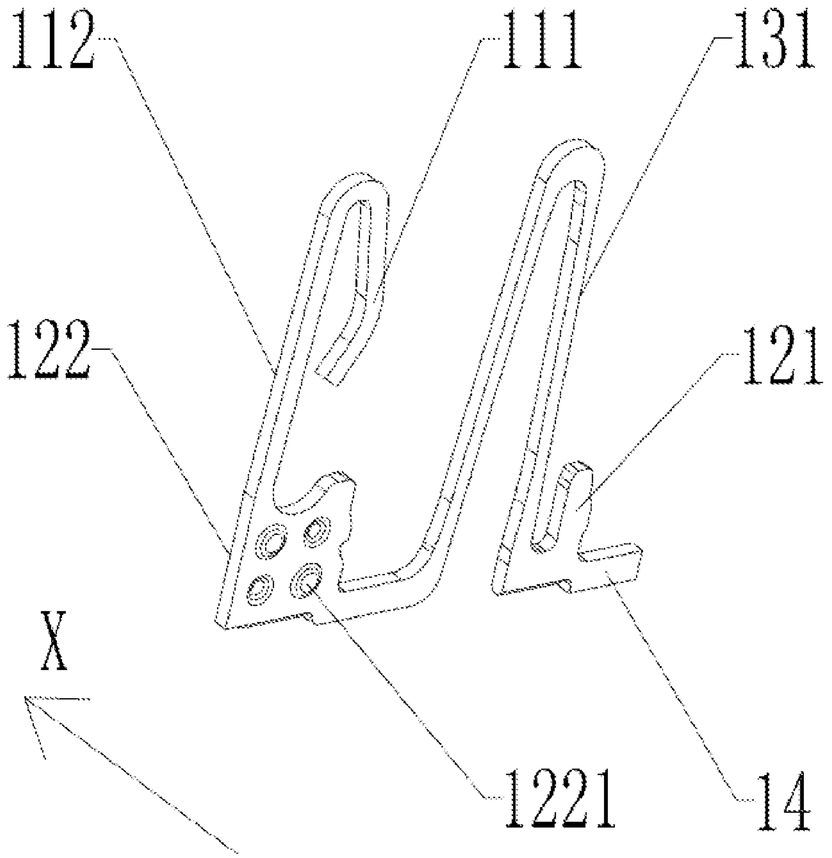
FIG. 3 is a structural schematic diagram of FIG. 1 at another viewing angle.
Figure 4:
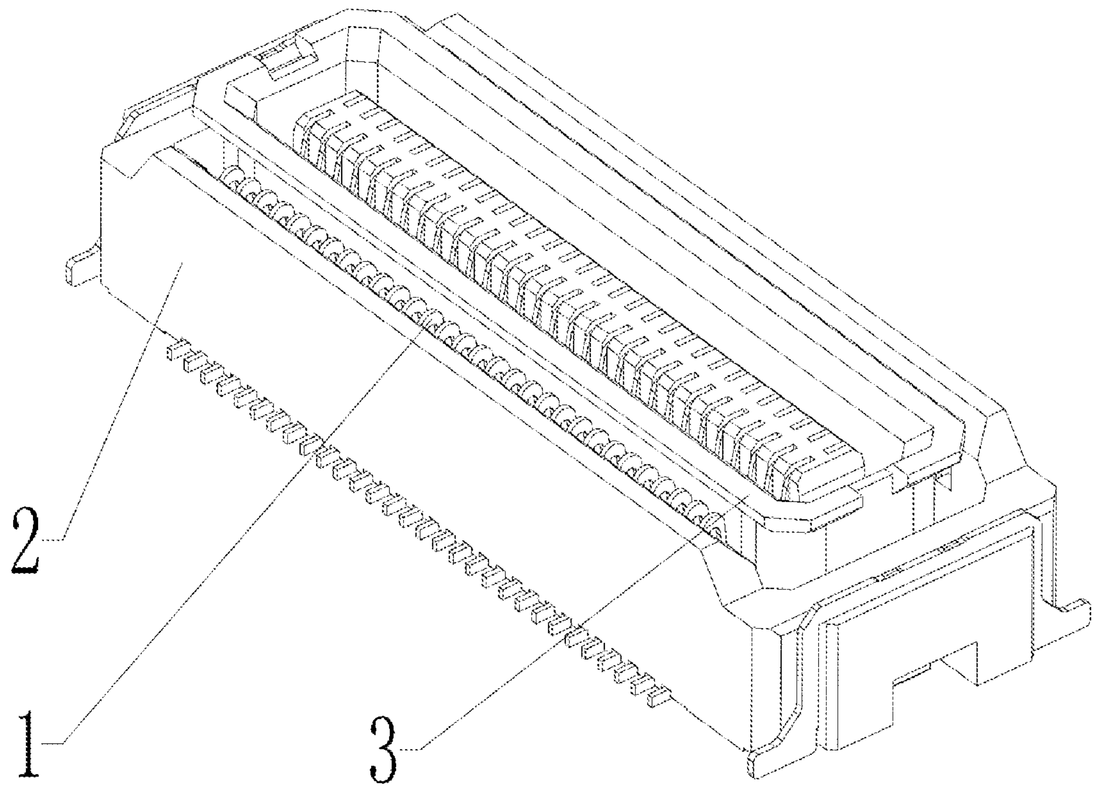
FIG. 4 is a structural schematic diagram of a floating connector according to one embodiment of the present disclosure.

As shown in FIGS. 1-3, the present disclosure provides an electrical connecting member 1, the electrical connecting member 1 is configured on an inner base 3, and an accommodating groove 321 is defined on the inner base 3. The electrical connecting member 1 includes an elastic connecting portion 13, a first fixing portion 121, and a second fixing portion 122. The first fixing portion 121 and the second fixing portion 122 are disposed on two sides of the elastic connecting portion 13. A contact head portion 11 is disposed on the second fixing portion 122 in an upward direction. The contact head portion 11 includes an extending segment 112 and a bending segment 113. An electrical contact region is defined between the extending segment 112 and the connecting portion 113. The bending segment 113 is bent towards a lower part of the electrical contact region, and the bending segment 113 is connected to the second fixing portion 122 through the extending segment 112. A free end of the bending segment 113 is bent towards the extending segment 112 to form an arc-shaped protrusion 111, the free end of the bending segment 113 is disposed in the accommodating groove 321, and the arc-shaped protrusion 111 at least partially protrudes out of the accommodating groove 321 so as to be electrically connected to an external contact component 41.

In the electrical connecting member 1 of the present disclosure, the electrical contact region is defined between the extending segment 112 and the connecting portion 13 of the contact head portion 11 of the electrical connecting member 1. The bending segment 113 of the contact head portion 11 is bent towards the lower portion of the electrical contact region and is disposed on the second fixing portion 122 through the extending segment 112, so as to be bent inward to realize rapid and efficient electrical contact. In particular, the arc-shaped protrusion 111 newly defined at the free end of the bending segment 113 is specifically bent relative to the whole and is elastically guided to the inner end side of the electrical contact region to form the arc-shaped protrusion 111 in a free end portion in a contact direction, so that the arc-shaped protrusion 111 is adaptively and elastically engaged on a matched external contact component 41 after being contacted, which significantly improves operability of the elastic contact. In addition, the free end portion of the bending and guiding inward contact head portion 11 is more flexible and has better elastic recovery, which greatly improves a contact mode of a contact head, avoids a collapse problem caused by frequent joint work of the contact head portion 11, and improves overall service life of the electrical connecting member 1.

Specifically, the electrical connecting member 1 is configured as a contact sheet, and the contact sheet has at least a contact head portion 11, fixing portions 12, a connecting portion 13, and an extending portion 14. A first fixing portion 121 and a second fixing portion 122 are defined in the fixing portions 12 of a middle portion of body of the contact sheet body. The connecting portion 13 is connected between the first fixing portion 121 and the second fixing portion 122. The extending portion 14 extends along the first fixing portion 121 to an outer end portion of the connecting portion 13. The contact head portion 11 extends in a direction adapted to be in contact with the outer contact component 41 and is disposed at another outer end portion of the connecting portion 13. The contact head portion 11 is bent and elastically guided on an inner end side of the contact sheet, and the arc-shaped protrusion 111 is defined in the contact direction on the contact head portion 11. The arc-shaped protrusion 111 is in a free end portion and adaptively implements elastic limiting engagement after being contacted. In the present embodiment, a plurality of the fixing portions 12 for base holding, an extending portion 14 and a contact head portion 11 disposed at different outer end sides are constructed in a middle portion and outer end portions of the contact sheet of the electrical connecting member 1. In particular, the contact head portion 11 is bent relative to the whole and is guided elastically on the inner end side of the contact sheet, so as to form the arc-shaped protrusion 111 in the free end portion in the contact direction, so that the arc-shaped protrusion 111 is adaptively and elastically engaged on the matched external contact component 41 after being contacted.

In one embodiment, the extending segment 112 of the contact head portion 11 is smoothly connected to an upper side of the second fixing portion 122, and the arc-shaped protrusion 111 is defined at a tail end of the bending segment 113. Specifically, the extending segment 112 extends smoothly upwards from an outer side edge of the second fixing portion 122 and is inclined towards an inner side of the second fixing portion 122 to form a certain inclination angle, so as to improve resilience of the contact head portion 11 at positions of the outer end portions.

The bending segment 113 is U-shaped. The arc-shaped protrusion 111 protrudes inwards relative to the extending segment 112 and bends outwards to extend, and the arc-shaped protrusion 111 is freely spaced from the extending segment 112. The arc-shaped protrusion 111 defined at an end of the bending segment 113 and the extending segment 112 are spaced apart from each other. The end portion of the arc-shaped protrusion 111 has a smaller spacing from the extending segment 112 after being bent. Thus, the free end portion of the arc-shaped protrusion 111 is suspended at an end position and provides a greater swing margin to the contact head portion 11 in the contact direction.

As shown in FIGS. 2-3, in one embodiment, components on the electrical connecting member have a same thickness. In particular, functional components on the electrical connecting member 1 have the same thickness, and widths on orthographic projections are not identical. The connecting portion 13 is configured in a U-shaped flexible 131 that is elastically deformed in a left-right direction, U-shaped two side edges of the connecting portion 13 are connected to the first fixing portion 121 and the second fixing portion 122. When the connecting portion 13 is projected in an X-axis direction, for example, in an orthographic direction of the electrical connecting member 1 shown in FIG. 3, a middle width of the two side edges is smaller than a top width or a root width of the connecting portion. In the embodiment, when the connecting portion 13 is projected in the X-axis direction, the width of the two side edges of the connecting portion gradually increases from middle to bottom of the connecting portion, so that a large rounded corner connection is formed where the two side edges respectively connect with the first fixing portion 121 and the second fixing portion 122. Therefore, the U-shaped ends are respectively horizontally extending to the fixing portions 12. The U-shaped flexible 131 is in a state of increased width at the end portion and a bottom of the U-shaped flexible 131. Therefore, a large rounded corner connection in a form of an R-angle is formed between the two side edges and the respective fixing portions 12 and at joints of the two side edges. Furthermore, the U-shaped flexible 131 is connected to the R-angle, so that the top width and the root width of the U-shaped flexible 131 are increased, the widths of the two side edges are small, and whole flexible connection strength and elastic deformation force are ensured.

In particular, the U-shaped bending segment 113 and the U-shaped flexible 131 are substantially the same in a bending direction and an orientation of the electrical connecting member, which are both bent downwards. A bending reference height of the U-shaped bending segment 113 is slightly larger than a bending reference height of the U-shaped flexible 131, so that a contact orientation of the arc-shaped protrusion 111 is defined, and the arc-shaped protrusion 111 and the external contact component 41 are further abutted and matched with each other.

As shown in FIGS. 2-3, in one embodiment, components on the electrical connecting member 1 have a same thickness, a projection of the second fixing portion 122 in the X-axis direction is in a sheet shape, and the extending segment 112 extends upwardly from a portion of the sheet-shaped second fixing portion 122. Specifically, each thickness of the components on the electrical connecting member 1 is consistent, which facilitates batch manufacturing and production, and is beneficial to maintaining a certain strength.

When the electrical connecting member 1 is projected in the X-axis direction, the second fixing portion 122 is in a rectangular sheet shape, and a width of the extending segment 112 is smaller than a length or a width of the rectangular sheet shape. In particular, the second fixing portion 122 is recessed downwards to form a connection angle with the extending section 112. In this way, a longest force arm is obtained in a limited length space, which is beneficial to improving elastic force of the contact head portion 11.

As shown in FIGS. 2-3, in one embodiment, a plurality of positioning convex hulls 1221 are defined on the second fixing portion 122, and the positioning convex hulls 1221 are distributed on a front side and a rear side of the second fixing portion 122. Furthermore, the positioning convex hulls 1221 have four, two of the positioning convex hulls 1221 are defined at the front side, and the other two of the positioning convex hulls 1221 defined diagonally are defined on the other side. Therefore, the plurality of the positioning convex hulls 1221 are defined on a front surface and a back surface of the second fixing portion 122 in a staggered manner. Each of the positioning convex hulls 1221 at any one end surface is defined opposite to each other. Positioning protrusions are formed through integrally stamping a contact sheet, and cooperate with each other symmetrically to define a central assembly position of the whole electrical connecting member 1. For installation adaptation between the second fixing portion 122 and the second mounting cavity 34 on the inner base 3, please refer to the following in a floating connector below.

In the present embodiment, the plurality of the positioning convex hulls 1221 are defined on the fixing portion 12. The plurality of the positioning convex hulls 1221 are distributed on left and right sides of the second fixing portion 122, so that when the electrical connecting member 1 is disposed on the inner base 3, the contact head portion 11 is in a centered position in the accommodating groove 321. In particular, a width of the accommodating groove 321 is greater than a thickness of the contact head portion 11 so as to facilitate elastic movement of the arc-shaped protrusion 111 between the accommodating groove 321 and a clamping space.

Furthermore, an outer side periphery of the second fixing portion 122 is in an L-shaped linear shape, and an inner side peripheral of the second fixing portion 122 is configured as a special-shaped protrusion structure that facilitates fitting and fixing. The outer side periphery of the L-shaped linear shape is conveniently connected to the extending portion 14 in a smooth manner, and is connected to the connecting portion 13 in a side direction. The inner side peripheral of the special-shaped protrusion structure is relatively steep and concave-convex, so that a more rapid and efficient interference fit is formed in the second mounting cavity 34.

In one embodiment, the first fixing portion 121 extends outwards to form an extending portion 14 for electrical connection. A bolt is disposed between the first fixing portion 121 and the extending portion 14. Therefore, the first fixing portion 121 is configured as the bolt for engaging and butt-jointing to define a position of the first fixing portion 121, and the bolt extends upwards at a joint of the first fixing portion 121 and the extending portion 14. For installation adaptation between the first fixing portion 121 and the first mounting cavity 21 on the outer base 2, please refer to the following in the floating connector below.

More specifically, as shown in FIGS. 1-2, the inclination angle of the extending segment 112 is between 2° and 5°, and the elastic force of the contact head portion 11 and the service life of the extending segment 112 reach an optimal state when the inclination angle is 3°. The U-shaped bending segment 113 has a bending angle of 10° to 20° relative to the extending segment 112, and an effect is particularly significant when the bending angle is 15°. In addition, a protruding angle of the arc-shaped protrusion 111 is 130° to 150° along the bending segment 113, and an optimal bending setting is achieved when a bending arc is 137°.

In one embodiment, the electrical connecting member 1 is formed through stamping one time, and the electrical connecting member 1 is made of metal conductive material. It should be mentioned that traditionally, a desired shape is first punched out, then bent, and finally cut to form the finished electrical connecting members, which involves many processes. After the electrical connecting members are bent, due to an internal stress problem, the electrical connecting members are stretched to different degrees, so that the final shapes of the electrical connecting members are different, and finally qualities of the electrical connecting members are influenced. In the embodiment, one-time stamping is adopted to ensure that the shape of the electrical connecting member 1 is consistent, which significantly improves the quality of the electrical connecting member 1.

As shown in FIGS. 4-7, the present embodiment further provides a floating connector, including an outer base 2, an inner base 3, and electrical connecting members passing through the outer base 2 and the inner base 3 and being held by the outer base 2 and the inner base 3. A fitting portion 31 for insertion of an external plug connector is disposed on the inner base 3. The outer base 2 loads the inner base 3 in a movable manner through a plurality of the electrical connecting members, and the electrical connecting members are disposed regularly. An accommodating groove 321 is defined on the fitting portion 31 of the inner base 3. The contact head portion 11 is disposed in the accommodating groove 321, and the arc-shaped protrusion 111 is at least partially exposed outside the accommodating groove 321. The free end of the arc-shaped protrusion 111 extends back into the accommodating groove 321 and is in a suspended state in an initial position.

An upper end portion of the extending segment 112 is obliquely bent towards a bottom of the accommodating groove 321 to form a bending segment 113. An arc-shaped protrusion 111, for forming the contact head portion 11 and the external contact component 41 in electrical contact with each other, is defined on the bending segment 113. The arc-shaped protrusion 111 is at least partially defined in the clamping space, and the free end of the arc-shaped protrusion 111 is bent towards the extending segment 112 and then is defined in the accommodating groove 321. Therefore, after the contact head portion 11 is connected to the extending segment 112 and the bending segment 113, an elastic arm of the contact head portion 11 is lengthened, so that an elastic reset force is improved, and problems that the electrical connecting member 1 is stuck and broken are greatly avoided.

In the above, the elastic deformation is formed through the connecting portion 13 connected between the two fixing portions 12, so that the two bases freely move, and then a floating displacement is generated to compensate for an alignment inserting problem between the floating connector and the plug connector matched with the floating connector. The accommodating groove 321 defined through the fitting portion 31 of the inner base 3 is configured to mount the contact head portion 11. The arc-shaped protrusion 111 of the contact head portion 11 is at least partially exposed out of the groove, and the free end of the contact head portion 11 extends in a bending manner and is suspended in the accommodating groove 321, so that reliability of a contact process is greatly improved. The suspended free end portion provides a swinging allowance of the contact head portion 11 in the contact direction, and then the contact head portion 11 is matched with the elastic recovery of the contact head portion 11, so that the contact mode is more flexible and reliable.

Figure 5:
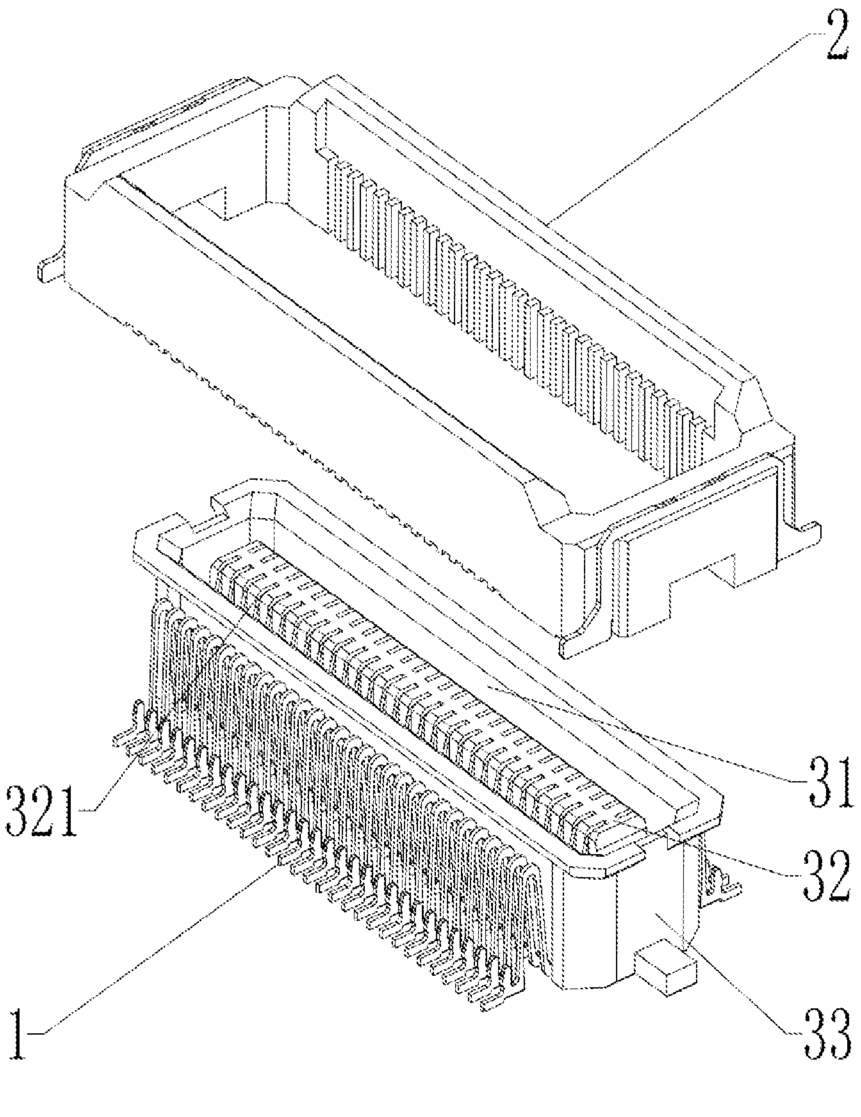
FIG. 5 is a schematic diagram of partially disassembled of FIG. 4.
Figure 7:
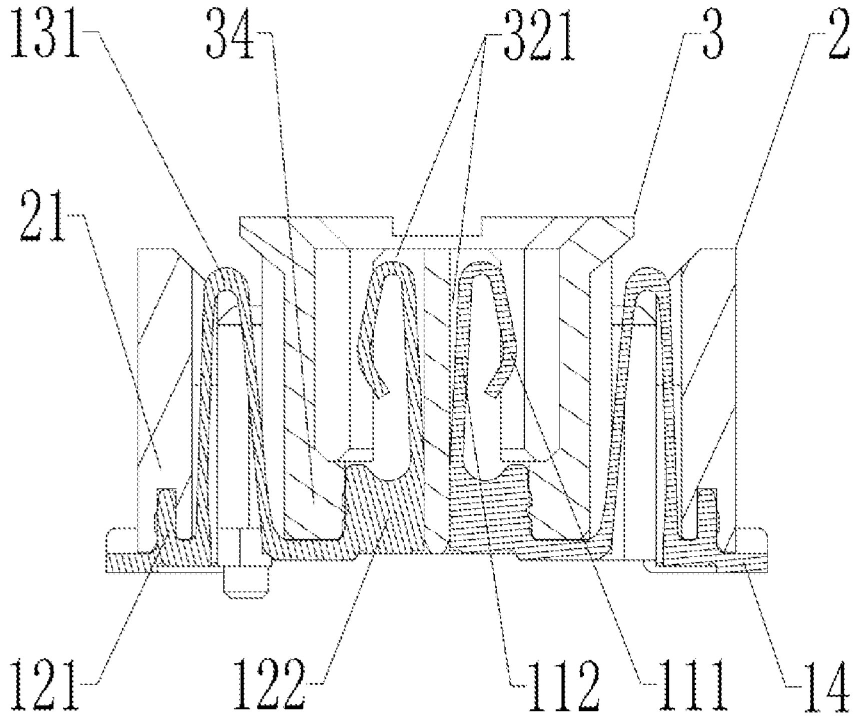
FIG. 7 is a cross-sectional schematic diagram of FIG. 6 at another viewing angle.

As shown in FIG. 5 and FIG. 7, in one embodiment, the accommodating groove 321 is defined on a base portion 32 formed through the fitting portion 31 in a regular manner with respective to the contact head portion 11 of each electrical connecting member 1. The accommodating groove 321 is defined through at least upper and outer sides of the base portion 32. On one hand, the through-defined accommodating groove 321 facilitates a one-time demolding mode of the base in an integrated manufacturing process, which simplifies the manufacturing process. On the other hand, the accommodating groove 321 penetrating upward allows the bending segment 113 of the contact head portion 11 to be more freely disposed in the groove without being constrained, and a height of the base portion 32 is sunk to be shorter than the bending reference height of the bending segment 113, so that manufacturing costs of the base are greatly reduced. In addition, the accommodating groove 321 penetrating to the outer side allows the arc-shaped protrusion 111 to be exposed, which performs abutting operation with the contact component 41 outside the base portion 32.

More specifically, an outer body 33 of the inner base 3 and the base portion 32 disposed in a middle portion form the clamping space for accommodating the plug connector. The arc-shaped protrusion 111 is at least partially defined in the clamping space and is configured to abut against the external contact component 41. In the present embodiment, the height of the bending segment 113 is shorter than the height of the base portion 32, and a lateral projection of the arc-shaped protrusion 111 is exposed in the clamping space. In addition, the base portion 32 is submerged in the inner base, so that the height of the base portion 32 is smaller than a height of the outer body 33.

In addition, a notch structure is defined on an outer edge of the outer body 33 at two ends in a longitudinal direction. The whole outer body 33 is disposed along projection direction thereof, so that respective components are mutually vacated, without any overlap, which reduces costs of insulating plastic shells and realizes a rapid production mode of the one-time demolding.

It should be noted that a second mounting cavity 34 is defined on a bottom of the inner base 3, and the second mounting cavity 34 is communicated with the accommodating groove 321. The second fixing portion 122 is embedded in the second mounting cavity 34, so that the extending segment 112 and a groove wall of the accommodating groove 321 are in clearance fit with each other. Specifically, the second fixing portion 122 and the second mounting cavity 34 are in interference fit with each other. The second mounting cavity 34 is configured to facilitate the second fixing portion 122 to engage with a centrally placed embedding groove. The second fixing portion 122 is assembled in the embedding groove in a centered manner through the positioning convex hulls 1221 defined on the front surface and the back surface of the second fixing portion 122.

Particularly, as shown in FIG. 7, a clamping portion (not shown) is disposed on the second fixing portion 122, which is configured to prevent the electrical connecting member 1 from disengaging from the inner base. The clamping portion and the extending segment 112 are disposed opposite to each other, and a side of the second fixing portion 122 close to the extending segment 112 abuts against an inner wall of the second mounting cavity 34. In a bottom-up direction, a gap between the extending segment 112 and the groove wall of the accommodating groove 321 is gradually increased, so that the bending segment 113 with the arc-shaped protrusion 111 is obliquely disposed towards an inner end side of the electrical connecting member 1. In the above, the second fixing portion 122 is attached to the inner wall of the second mounting cavity 34. The extending segment 112 extends smoothly upwards from the outer side edge of the second fixing portion 122 and is inclined towards the inner side to form the certain inclination angle, so that the extending segment 112 has different gaps in the groove wall. The closer it is to the bending reference height, the larger the gap between the contact head portion 11 and the groove wall is, and the elastic force of the contact head portion 11 during the contact connection process is further improved. When the external contact component 41 abuts against the arc-shaped protrusion 111, the elastic force of the extending segment 112 on the second fixing portion 122 is swing, so that contact stress is unloaded. After the extending segment 112 is completely attached to the groove wall, the elastic recovery of the arc-shaped protrusion 111 on the free end of the arc-shaped protrusion 111 is further implemented, so that a purpose of multi-mode contact reset rebound is achieved.

In one embodiment, a first mounting cavity 21 is defined on a bottom of the outer base 2. The first fixing portion 121 is embedded in the first mounting cavity 21. The first fixing portion 121 and the second fixing portion 122 are disposed at a same reference position. Obviously, the outer base 2 and the inner base 3 are elastically assembled together through the plurality of the electrical connecting members 1, and the bottoms of the bases are substantially flush to facilitate placement on an external circuit board, thereby implementing electrical connection between the extending portion 14 and the outside.

Figure 6:
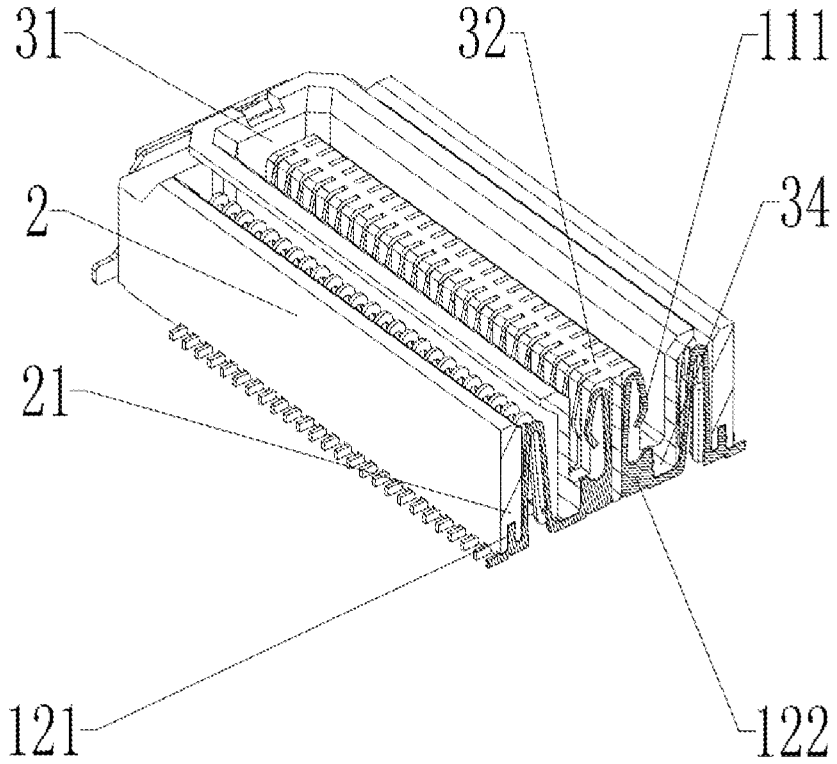
FIG. 6 is a cross-sectional schematic diagram of a floating connector according to one embodiment of the present disclosure.

As shown in FIGS. 6-7, the second fixing portion 122 is embedded in the second mounting cavity 34. The connecting portion 13 is disposed between the outer base 2 and the inner base 3, and is disposed opposite to the first mounting cavity 21 of the outer base 2 in a manner that is distal from the second mounting cavity 34. In the embodiment, the elastically deformable connecting portion 13 is specifically disposed between the outer base 2 and the inner base 3, so as to be distal away from the second mounting cavity 34. On one hand, a distance between the two bases is increased through the connecting portion 13, a floating amount threshold is improved, and a heat dissipation configuration between the bases is facilitated. On the other hand, the second fixing portion 122 is fitted and fixed with the second mounting cavity 34, and the connecting portion 13 is moved forward and disposed distal from the second fixing portion 122 and the second mounting cavity 34. In a floating process, it is ensured that stress on the electrical connecting member 1 moves forward to the more elastic connecting portion 13, which significantly improves tensile and compressive strength of the whole electrical connecting member.

A distance between one side of the U-shaped flexible 131 and an outer wall of the inner base 3 is larger than a distance between the other side of the U-shaped flexible 131 and an inner wall of the outer base 2. Therefore, the connecting portion 13 is configured as a U-shaped flexible 131 that is elastically deformed in the left-right direction, and the distances between the two sides of the U-shaped flexible 131 with the inner base 3 and the outer base 2 are different. In order to be distal away from the inner base 3 to achieve a purpose of prestressing, the distance between the side of the U-shaped flexible 131 with the outer wall of the inner base 3 is larger.

Figure 8:
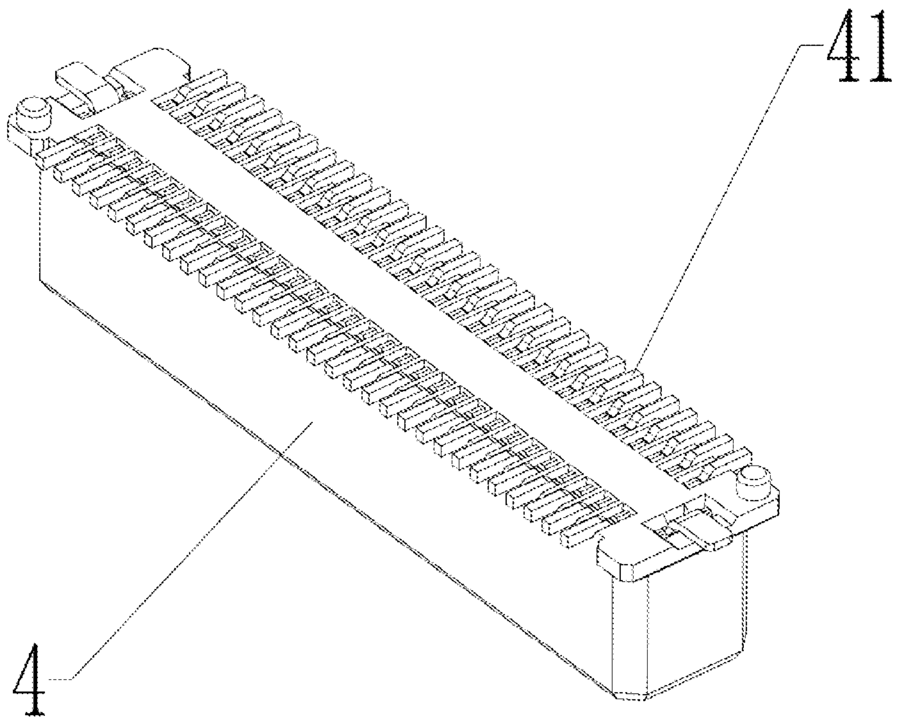
FIG. 8 is a structural schematic diagram of a plug connector according to one embodiment of the present disclosure.
Figure 9:
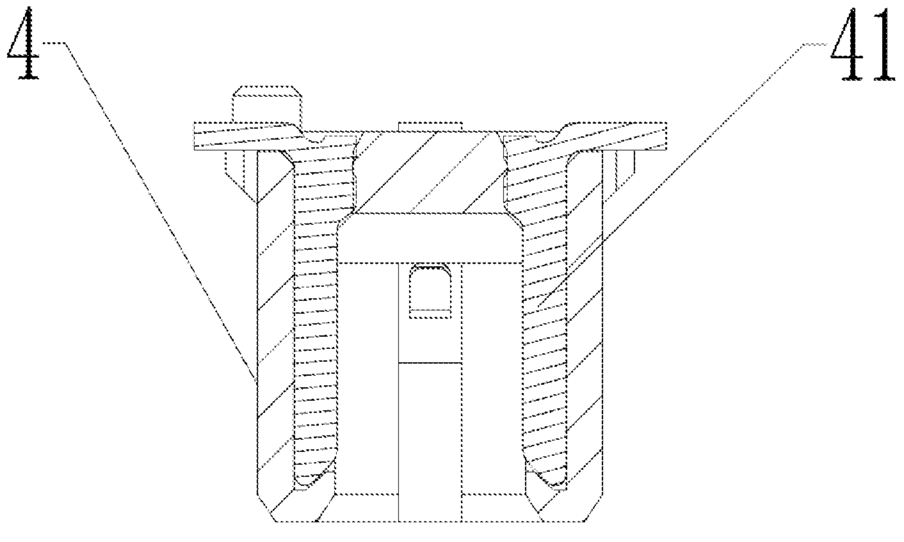
FIG. 9 is a cross-sectional schematic diagram of the plug connector according to one embodiment of the present disclosure.
Figure 10:
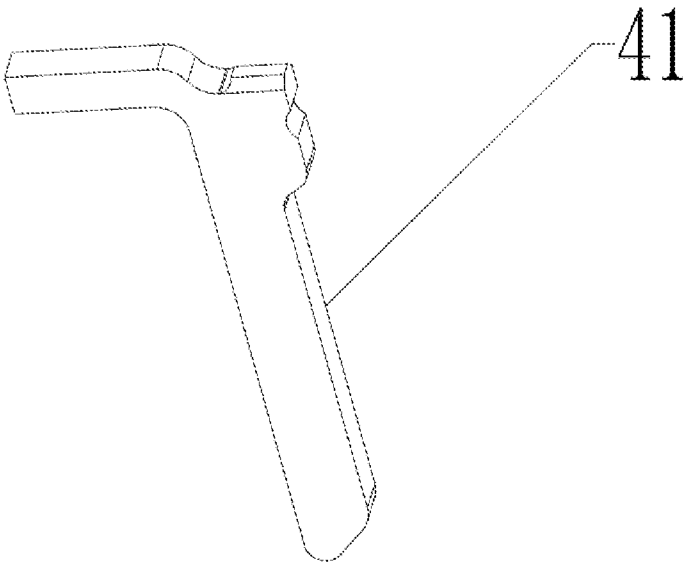
FIG. 10 is a structural schematic diagram of a contact component of the plug connector according to one embodiment of the present disclosure.

As shown in FIGS. 8-10, the present embodiment further provides a plug connector, including: a plug-in matching portion 4 and the contact component 41. The plug-in matching portion 4 is configured to plug-fit with the floating connector relative to each other. The contact component 41 is elastically abutted against the contact head portion 11 to form a contact connection. In the embodiment, the plug-in matching portion 4 of the plug connector and the fitting portion 31 of the floating connector are in male butt joint with each other, so as to further form an electrical connection between the two connectors.

The contact component 41 is an L-shaped plate body, a short edge of the contact component 41 is transversely disposed and exposed on an outer end side of the plug connector, and a long edge of the contact component 41 is vertically disposed on an inner end side of the plug connector to laterally press the contact head portion 11. The contact component 41 is formed through stamping a blanking material, and a thickness of the short edge is smaller than a thickness of the long edge. Therefore, the short edge with a smaller length and a smaller width is directly and integrally welded with an external integrated chip, and the long edge with a larger length and a larger width is suitable for abutting against a front surface of the arc-shaped protrusion 111 of the contact head portion 11 in an elastic abutting mode.

Figure 11:
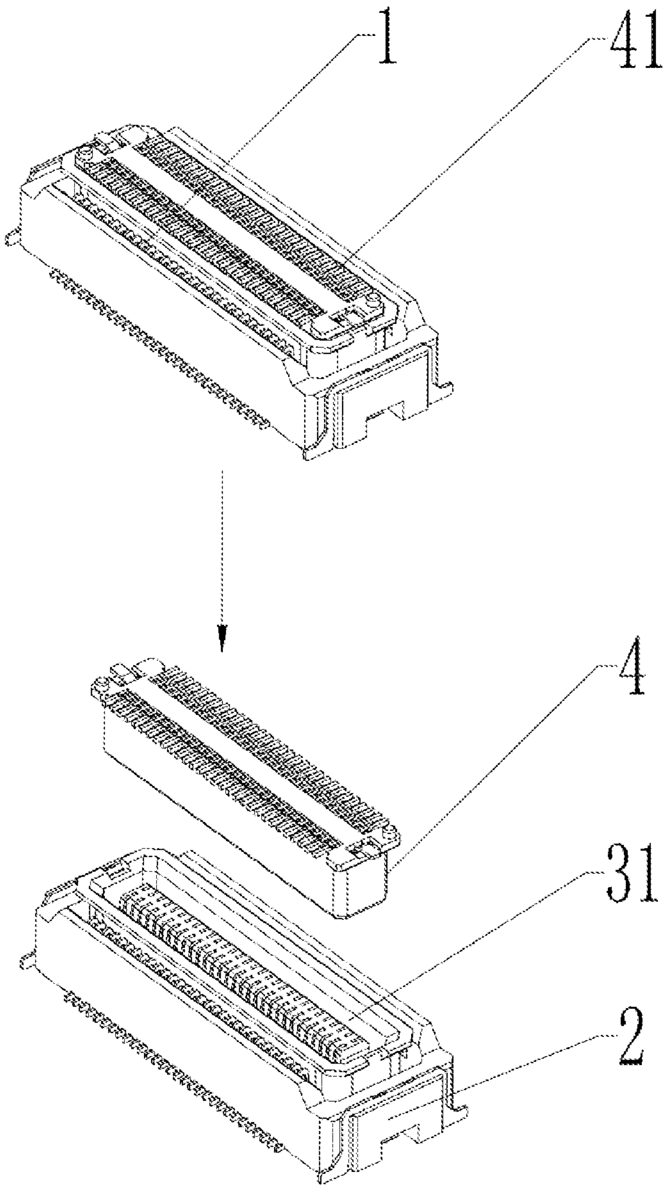
FIG. 11 is a structural schematic diagram of a mating connector according to one embodiment of the present disclosure, wherein an arrow represents an insertion process state.
Figure 12:
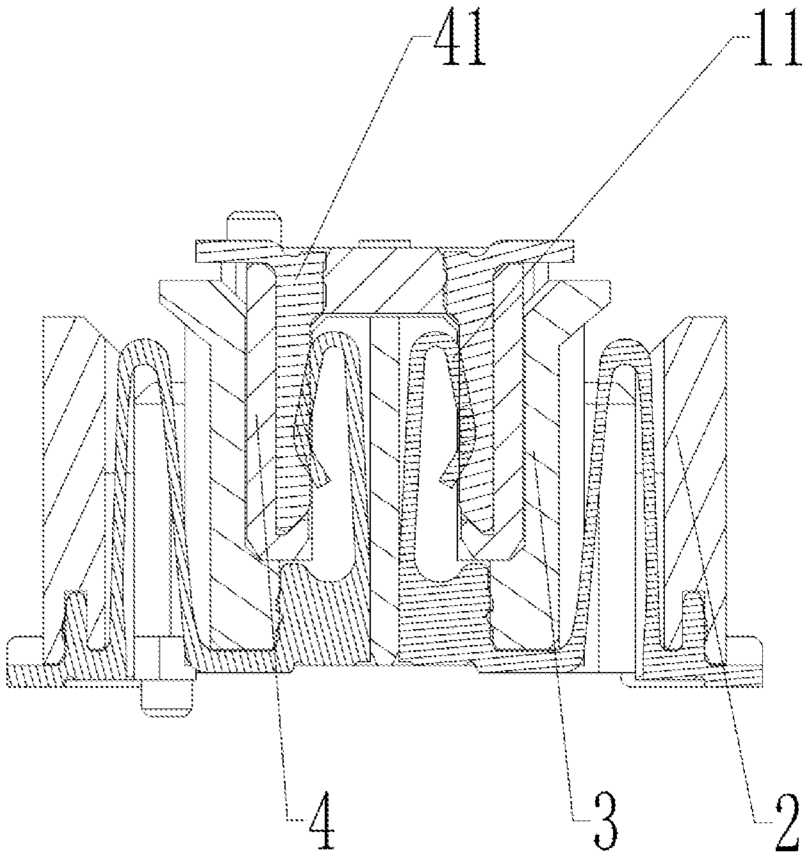
FIG. 12 is a cross-sectional schematic diagram of the mating connector according to one embodiment of the present disclosure.

As shown in FIGS. 11-12, the present embodiment further provides a mating connector. The mating connector includes at least a floating connector and a plug connector adapted to mate with each other. The floating connector is welded on the external circuit board, and the plug connector is welded to the external integrated chip.

The above-mentioned embodiments are only preferred embodiments of the present disclosure, and a protection scope of the present disclosure is not limited to the above embodiments. The technical solutions of the present disclosure belong to the protection scope of the present disclosure.

What is claimed is:

1. An electrical connecting member, comprising:

an elastic connecting portion;

a first fixing portion;

a second fixing portion; and a contact head portion;

wherein the electric connecting member is configured on an inner base, an accommodating groove is defined on the inner base; the first fixing portion and the second fixing portion are respectively disposed on two sides of the elastic connecting portion; a contact head portion is disposed on the second fixing portion in an upward direction;

the contact head portion comprises an extending segment and a bending segment, an electrical contact region is formed between the extending segment and the elastic connecting portion, the bending segment is bent towards a lower portion of the electrical contact region, the bending segment is connected to the second fixing portion through the extending segment; and a free end of the bending segment is bent towards the extending segment to form an arc-shaped protrusion, the free end of the bending segment is disposed in the accommodating groove, and the arc-shaped protrusion at least partially protrudes out of the accommodating groove so as to be electrically connected to an external contact component.

2. The electrical connecting member according to claim 1, wherein components on the electrical connecting member have same thickness, the elastic connecting portion is configured in a U-shaped flexible shape, where the U-shaped flexible shape is elastically deformed in a left-right direction, two side edges of the elastic connecting portion are respectively connected to the first fixing portion and the second fixing portion; and when the elastic connecting portion is projected in an X-axis direction, a middle width of the two side edges of the elastic connecting portion is smaller than a top width or a root width of the elastic connecting portion.

3. The electrical connecting member according to claim 2, wherein when the elastic connecting portion is projected in the X-axis direction, the width of the two side edges of the elastic connecting portion gradually increases from middle to bottom of the elastic connecting portion, so that a large rounded corner connection is formed where the two side edges respectively connect with the first fixing portion and the second fixing portion.

4. The electrical connecting member according to claim 1, wherein the first fixing portion extends outwards to form an extending portion, and a bolt is disposed between the first fixing portion and the extending portion.

5. The electrical connecting member according to claim 1, wherein components on the electrical connecting member have same thickness, a projection of the second fixing portion in an X-axis direction is in a sheet shape, and the extending segment extends upwardly from a portion of the sheet-shaped second fixing portion.

6. The electrical connecting member according to claim 5, wherein when the electrical connecting member is projected in the X-axis direction, the second fixing portion is in a rectangular sheet shape, and a width of the extending segment is smaller than a length or a width of the rectangular sheet shape.

7. The electrical connecting member according to claim 6, wherein a plurality of positioning convex hulls are defined on the second fixing portion, and the plurality of the positioning convex hulls are distributed on a front side of the second fixing portion and a rear side of the second fixing portion.

8. The electrical connecting member according to claim 7, wherein four positioning convex hulls are defined on the second fixing portion, two of the four positioning convex hulls are diagonally defined at a first surface of the second fixing position, and other two of the four positioning convex hulls are diagonally defined on a second surface of the second fixing position.

9. The electrical connecting member according to claim 8, wherein the second fixing portion is recessed downwards to form a connecting guide angle with the extending segment.

10. The electrical connecting member according to claim 1, wherein the electrical connecting member is formed through stamping one time, and the electrical connecting member is made of metal conductive material.

11. A floating connector, comprising:

an outer base;

an inner base; and the electrical connecting member according to claim 1;

wherein the first fixing portion is connected to the outer base, the second fixing portion is connected to the inner base, and the inner base is movable relative to the outer base under an action of the connecting portion.

12. The floating connector according to claim 11, wherein a clamping space and an accommodating groove for inserting an external object are defined on the inner base, the clamping space is adjacent to and communicates with the accommodating groove;

an extending segment of the electrical connecting member is disposed in the accommodating groove, an upper end of the extending segment is obliquely bent towards a bottom of the accommodating groove to form a bending segment, an arc-shaped protrusion defined on the bending segment is at least partially located in the clamping space, and a free end of the bending segment is bent towards the extending segment and then is located in the accommodating groove.

* * * * *